United States Patent [19]

Halpern et al.

[11] Patent Number: 5,023,114
[45] Date of Patent: * Jun. 11, 1991

[54] METHOD OF HYDROPHILIC COATING OF PLASTICS

[76] Inventors: Gregory Halpern, Wilson Park Dr., Tarrytown, N.Y. 10591; Charles Campbell, Highwood Pl., Alpine, N.J. 07620; Ellington M. Beavers, 931 Coates Rd., Meadowbrook, Pa. 19046; Huk Y. Cheh, 42-01 Auburndale La., Flushing, N.Y. 11358

[*] Notice: The portion of the term of this patent subsequent to Jan. 31, 2006 has been disclaimed.

[21] Appl. No.: 517,482

[22] Filed: May 2, 1990

Related U.S. Application Data

[60] Continuation of Ser. No. 198,358, May 25, 1988, abandoned, which is a division of Ser. No. 643,598, Aug. 23, 1984, Pat. No. 4,801,475.

[51] Int. Cl.$^5$ .......................... B05D 3/04; B05D 3/12; B32B 7/12; A61K 37/12
[52] U.S. Cl. .......................... 427/338; 427/2; 427/340; 427/399; 427/407.1; 427/407.2; 530/356
[58] Field of Search .................. 427/2, 338, 399, 340, 427/407.1, 407.2; 530/356

[56] References Cited

U.S. PATENT DOCUMENTS

| | | | |
|---|---|---|---|
| 3,882,036 | 5/1975 | Krezanosky et al. | 252/106 |
| 3,884,826 | 5/1975 | Phares, Jr. et al. | 252/106 |
| 3,954,644 | 5/1976 | Krezanoski et al. | 252/106 |
| 4,240,163 | 12/1980 | Galin | 427/2 |
| 4,264,155 | 4/1981 | Miyata | 351/160 |
| 4,280,954 | 7/1981 | Yannas et al. | 530/356 |
| 4,365,050 | 12/1982 | Ivani | 527/312 |
| 4,459,317 | 7/1984 | Lambert | 427/2 |
| 4,487,865 | 12/1984 | Balazs et al. | 524/29 |
| 4,500,676 | 2/1985 | Balazs et al. | 525/54.2 |

OTHER PUBLICATIONS

"Lens Implants for Cataracts are Offering More Protection", 'Technology' column of *The Wall Street Journal*, Friday, Jun. 29, 1984, paragraph 9.
Astra Medic AG: PCT/SE83/00191: WO83/03977-'-'Articles Exhibiting a Biocompatible Surface Layer and Process for Providing Articles with Such a Surface Layer".

*Primary Examiner*—John Kight, III
*Assistant Examiner*—P. Hampton-Hightower
*Attorney, Agent, or Firm*—William H. Eilberg

[57] ABSTRACT

Plastics, particularly a method of hydrophilic coating of plastics, for example, a contact lens, with a lubricating and visually acute mucopolysaccharide film which is immobilized upon the surface of the plastic for the lifetime of the plastic. A preferred method includes first coating the plastic with an aqueous solution of a mucopolysaccharide, drying by applying a water-miscible solvent, then crosslinking and permanently immobilizing the first coating upon the plastic by applying a solution of catalyzed organic soluble aliphatic polyisocyanate.

7 Claims, 3 Drawing Sheets

HYALURONIC ACID

CHONDROITIN SULFATE

METHOD OF HYDROPHILIC COATING OF PLASTICS

CROSS REFERENCES TO RELATED APPLICATIONS

This application is a continuation of application Ser. No. 07/198,358, filed May 25, 1988, abandoned, which is a division of Ser. No. 643,598, filed Aug. 23, 1984, now U.S. Pat. No. 4,801,475.

BACKGROUND OF THE INVENTION

1. Field of the Invention

Plastics with high flexural modulus, high tensile and compressive strength, and capable of being shaped into useful forms are water-insoluble and hydrophobic to a high degree, so that they are poorly wetted by water. Thus, water tends to form beads on the surface of an aircraft enclosure made of poly(methyl methacrylate), for example. Light transmitted through such a spottily wetted enclosure tends to be refracted and distorted by the multitude of water-droplet lenses on the plastic surface, and inefficient windshield wipers are called into play to improve the acuity of vision possible through such an enclosure. Enclosures whose surfaces exposed to the weather are coated with polysaccharides according to this invention, are uniformly wetted by water which does not "bead" on the surface but forms a continuous sheet of liquid causing little or no distortion of transmitted light.

Similarly, spectacle lenses made from the plastics commonly known as polycarbonate are hydrophobic and present a distorted view when wet with droplets of water. The golfer or pedestrian wearing such spectacles in a rain shower will suffer from impaired vision. In contrast, polycarbonate lenses prepared according to this invention are wetted uniformly by water and continue to provide good vision.

Similarly, body implants, such as plastic lenses for the eye and orthopedic joints and other bone replacements, often present problems with subnormal lubrication as the body recovers from the trauma of disease and its corrective treatment. It is not uncommon for the patient to endure pain and limited use of the affected part for lengthy rehabilitation periods. We find much improved results with products made according to the teachings of this invention, wherein the parts to be implanted are permanently coated with hydrophilic and highly lubricious polysaccharides closely related chemically and in physical character to materials normally present and acting as lubricants and humectants in the body domain.

Still another illustration of the application of this invention is in the manufacture and use of permanently slippery catheters. Plastic catheters with the grafted or crosslinked polysaccharide coatings, stored in aqueous medium such as isotonic solution, can be inserted into body orifices as necessary with remarkable ease and absence of pain. Similarly, vascular connectors to be left in the artery or vein for long periods while extracorporeal blood treatments are made can be less painfully inserted and often show decreased thrombosis formation when fabricated by the methods of this invention. This should contribute significantly to much more satisfactory longterm acceptance of the plastic intravascularly.

A basic feature of the invention which underlies all of these and other applications is that the surfaces of the treated plastic objects display wettability and lubricity uncharacteristic of such materials. Normally, materials showing such hydrophilic properties, such as gelatin, are easily distorted, have little or no strength, and show low modulus in flexure. The products of this invention display permanently the desirable surface characteristics of soft materials and at the same time have the strength and modulus of underlying structural plastics.

A second and basic distinguishing feature, related to the first, is the heterogeneous, laminar structure and composition of the products of this invention, comprising a load-bearing structural plastic whose surface is coated by an insoluble polysaccharide film intimately bound by high specific adhesion and/or by chemical bonds to the substrate. A cross-section of the articles of this invention, examined analytically from their outermost boundary into the bulk interior, would show a sharp transition from insoluble polysaccharide, thousandths of an inch thick, through a few mils of a tie-coat of markedly different composition, and finally into the main supporting plastic, such as polycarbonate, polymethyl methacrylate, polystyrene, polyformaldehyde, and the like. This chemical and physical heterogeneity is an essential feature of the new compositions of value.

2. Description of the Prior Art

It is well known to use polysaccharides such as hyaluronic acid and chondroitin sulfate in ophthalmic procedures and orthopedic surgery, to provide temporary lubrication of ocular or bone surfaces and interfaces. The desirable effects are only temporary, and repeating the treatment may not be possible after wound closure. There may also be unfavorable consequences of these uses, such as indications of glaucoma in some cases after use of preparations containing polysaccharides in ophthalmic surgery.

Ivani (U.S. Pat. No. 4,365,050) teaches the use of polysaccharides as components of mixtures to function as "artificial tears" to be dropped into the eye frequently, in contact lens cleaning solutions, and in anti-inflammatory ointments. He claims polymeric compositions formed by reacting polysaccharides with polymerizable monomers, silicone, pyrrolidone, and collagen. As shown clearly by his examples and disclosures, his polymeric compositions are prepared by conventional techniques such as mastication; emulsion, suspension and solution polymerization; and bulk polymerization in molds.

None of Ivani's polymer products anticipate the uniquely permanent, laminar structures of this present invention. Ivani's ophthalmic polymers, for example, are intended not to leave a residue of film on the contact lenses (Column 10, lines 62-63). The very preparative techniques employed by Ivani are unable to produce the laminar polymeric articles of this invention having hydrophilic outer surface. Ivani's only examples of forming his polymeric compositions show the grafting of methacrylic acid or MMA onto Chitin Flake, in which any laminar structure that might occur by chance would have the insoluble polysaccharide covered with acrylic polymer, a reversal of our invention, defeating its very purposes.

SUMMARY OF THE INVENTION

According to the present invention, hydrophilic coatings are immobilized upon plastics so as to provide lubricity and uniform wetting characteristics. For example, plastics such as contact lens, aircraft windshields and the like, may receive a hydrophilic coating in the form of a lubricating mucopolysaccharide film which is crosslinked or grafted onto the plastic surface for the lifetime of the plastic.

Manifestly, the hydrophilic coating may be applied to a wide range of plastic products including, by way of example, optical plastics orthopedic bone substitutes, catheters, hypodermics, intraocular lenses and the like.

DESCRIPTION OF THE PREFERRED EMBODIMENTS

Figure 1:
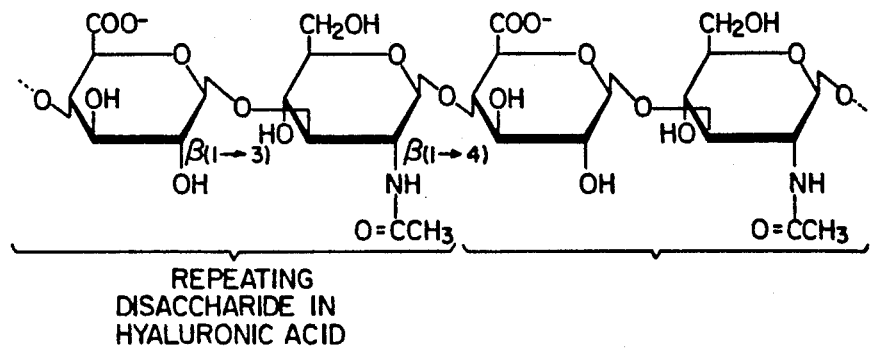
FIG. 1 is a presentation of the formula for hyaluronic acid.
Figure 2:
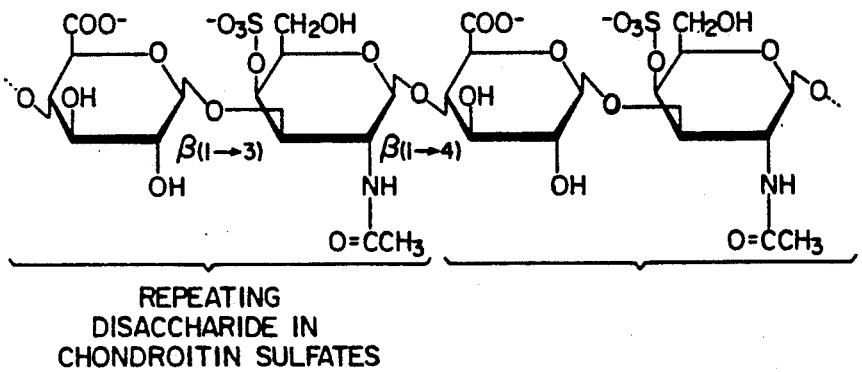
FIG. 2 is a presentation of the chemical formula for chondroitan sulfate.
Figure 3:
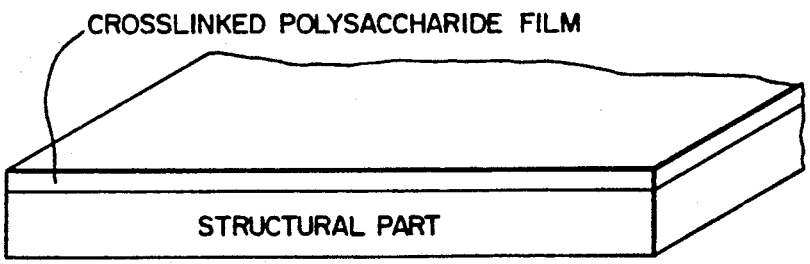
FIG. 3 is a partially fragmentary sectional view, showing crosslinking of the polysaccharide film to the plastic structural part, according to the examples 1 and 2.
Figure 4:
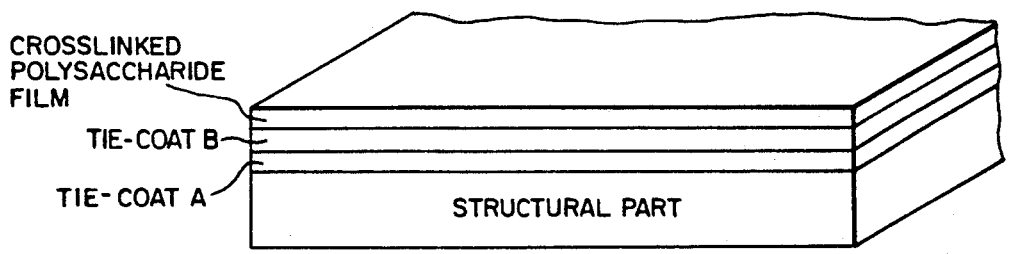
FIG. 4 is a partially fragmentary sectional view of the crosslinking, according to Example 3.
Figure 5:
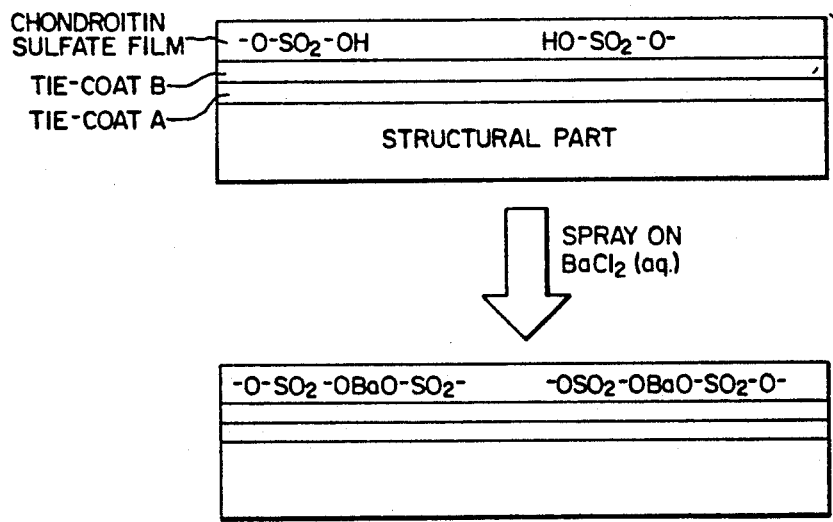
FIG. 5 is an exploded elevation, showing ionic crosslinking of chondroitan sulfate film, according to Example 5.
Figure 6:
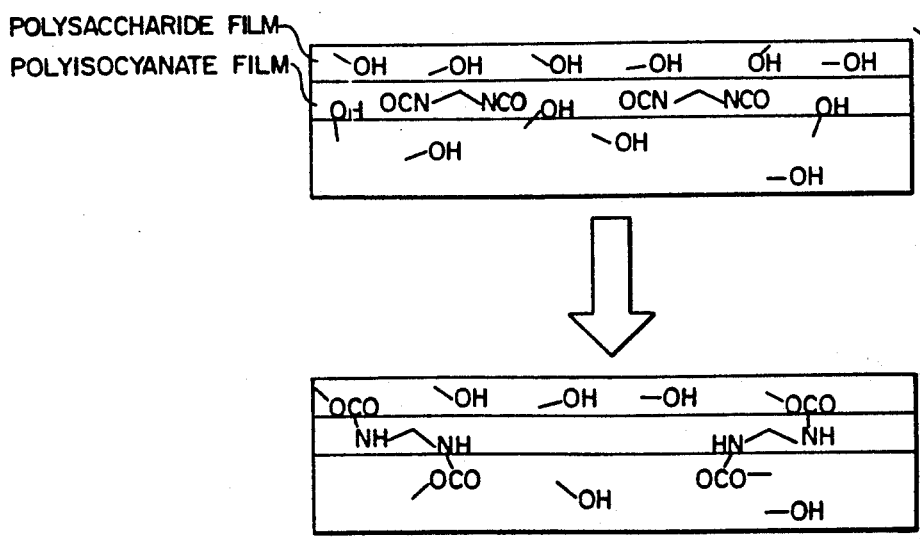
FIG. 6 is an exploded schematic view, showing covalent crosslinking and grafting of polysaccharide film according to Example 7.
Figure 7:
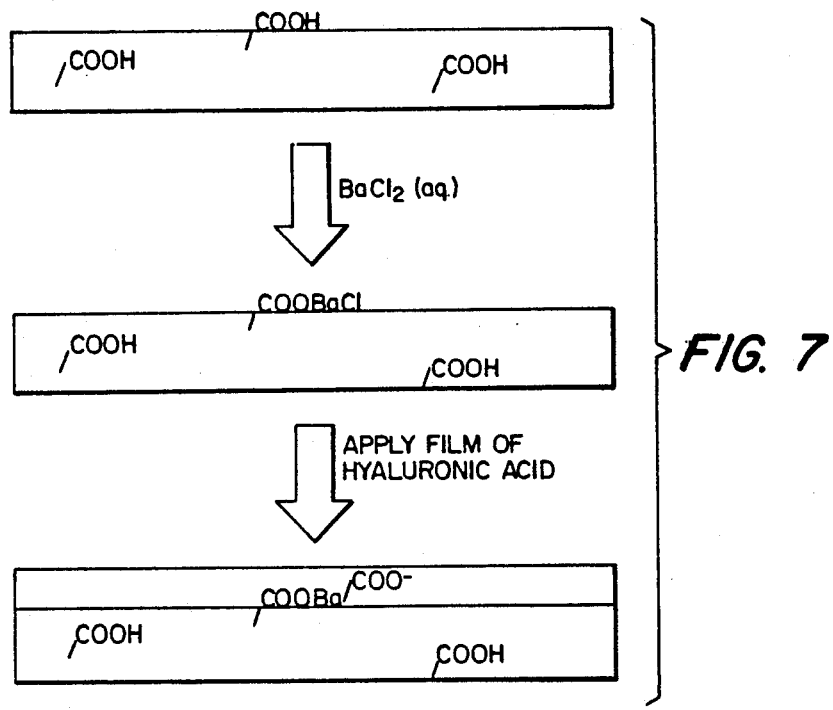
FIG. 7 is an exploded schematic view, showing ionic grafting and crosslinking of hyaluronic acid film according to Example 9.
Figure 8:
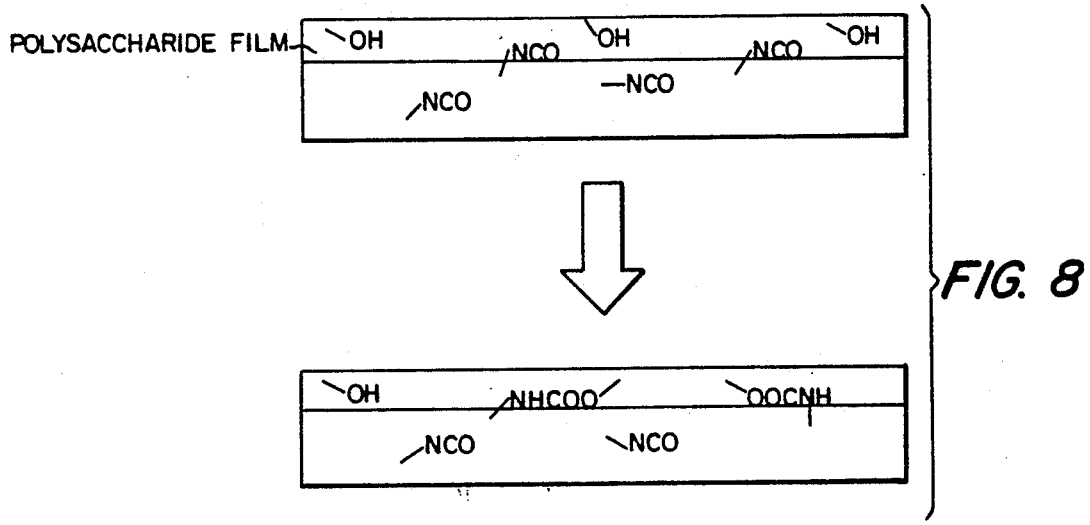
FIG. 8 is an exploded schematic view, illustrating covalent crosslinking and grafting of polysaccharide film upon isocyanatoethyl methyl methacrylate copolymer, according to Example 12.

In the interest of clarity, it may be useful to consider stepwise the processes by which the novel plastic compositions of this invention may be produced, but it should be understood that the steps described are illustrative, rather than limiting.

The first step is to fabricate the object of interest, such as a contact lens; a bone- or joint-replacement; a windshield or other transparent enclosure for autos, aircraft and other vehicles; a catheter; etc. These objects are made to normal specifications by conventional fabrication methods, such as injection molding, casting, compression molding, machining from billets, thermoforming, etc. In the discussion that follows, the product of this first step will be termed the "structural part."

The second step may be to prepare the structural part to receive the polysaccharide coating. Since the structural part will usually be made from a highly hydrophobic material, it will often be desirable to apply a tie-coat which is less hydrophobic but still similar enough to wet and adhere well to the part. The tie-coat will also present a more wettable surface for the polysaccharide coating, so that the composite is more uniformly and securely cohering.

In the third step, the polysaccharide coating is applied, usually from water solution, by any suitable, conventional method, such as spraying, knifecoating, brushing, dipping, etc. Thickness of the wet film will depend upon the molecular weight and viscosity of the polysaccharide, but will usually be in the range of 30 to 500 mils. Multiple coats may be applied with intermediate drying periods, in order to build up the film thickness into the range noted.

The fourth step is to dehydrate the polysaccharide coating. This is done by intimately contacting the coated object with volatile non-solvents for the polysaccharide but miscible with water, which precipitate the polysaccharide onto the tie-coat or structural part and carry away the water. Suitable non-solvents may for example be lower aliphatic alcohols, such as methanol or ethanol, or mixtures of ethanol and diethyl ether. Any tendency of the polysaccharide coating to wrinkle in this treatment can be alleviated by spraying lightly with N-methylpyrrolidone as a leveling agent, or by adding a small amount of N-methylpyrrolidone or butyl acetate to the non-solvents used in the precipitation. The coating is now allowed to dry in a stream of clean air properly safeguarded against fire and explosion. This precipitation/drying treatment may need to be repeated. The purpose is to obtain a polysaccharide coating as free of water as possible, for reasons that will become clear below.

The fifth step is to crosslink and/or graft the polysaccharide film to the tie-coat (if one has been used) and the tie-coat to the structural part. The polysaccharide must be insolubilized either by crosslinking or by grafting to the substrate; grafting to the structural part is an option, depending upon how aggressive the conditions of service for the part will be.

Crosslinking can be accomplished in any of a variety of ways. The molecules of any polysaccharide chosen will contain hydroxyl groups through which crosslinking can be accomplished, for example with di- or polyisocyanates. Hyaluronic acid, specifically, contains also a plurality of carboxyl groups through which ionic crosslinking reactions are possible, for example with polyvalent cations. Chondroitin sulfate contains not only hydroxyls as reactive groups, but also acid sulfate groups.

The tie-coat can also be designed to participate in crosslinking and grafting reactions by containing similar reactive groups, as for example a solutioon copolymer comprising a major amount of methyl methacrylate and a minor amount of hydroxyethyl methacrylate or methacrylic acid.

In like manner, the structural part may be a copolymer comprising a minor amount of a monomer designed to introduce hydroxyl, carboxyl or other reactive groups.

(The foregoing discussion will have clarified the need to dehydrate the polysaccharide film: isocyanates, diketenes, and other crosslinkers of choice may be able to react with any water present, rather than in the manner desired.)

TEST METHODS

When the articles of this invention have been properly made, their treated surfaces are readily wettable by water and remain so in service unless damaged in ways that might rupture or forcefully remove the insoluble polysaccharide coating. Indeed, wetting behavior of the surface is itself a significant test method indicating qualitatively and in practical terms whether the polysaccharide surface is present and uniform. Since the film is clear and invisible to the unaided eye, we found it desirable to develop additional test methods as means of confirming the continued presence and continuity of the coating under practical conditions of service. One was named the "Hockey Puck Test" and a second the "Dye Retention Test." These are described briefly as follows.

The Hockey Puck Test

This test relies upon the fact that the water-wet polysaccharide film is more slippery than the tie-coat or the surface of the structural part. It is useful primarily on flat or nearly flat panels which have been equilibrated with water by submersion for an hour or more.

The panel to be tested is inserted horizontally in an open-sided box-like frame. The "puck" is a small aluminum block with bottom surface freshly cleaned for each test. The block has a channel drilled horizontally into one side, connecting with a channel drilled vertically from the center of the top surface and internally threaded to receive an aluminum tube. Thin-walled rubber tubing is attached to this tube, with ample slack to provide for its free movement about the surface of the panel, leading to an on-off valve in a constant-pressure air line. The air pressure has been set at a level found by experience to cause ready sliding over a freshly prepared surface, but too low to cause sliding over the surfaces of tie-coat or structural part. If desired, the course of the puck can be guided to areas of special interest with a small rod in an experienced hand. In random movement over the panel surface, the puck will soon come to rest on any area that is bare due to improper preparation or to disruption in service.

The Dye Retention Test

This test requires that the polysaccharide film contain acidic functional groups such as carboxyls in the case of hyaluronic acid or acid sulfates in the case of chondroitin sulfate, for examples. The test may be thwarted by conversion in service of the acidic groups to salts of common cations such as calcium or iron, so that negative results should be taken to mean simply that the test is significant only with other evidence that the polysaccharide film is no longer present.

The panel to be tested is immersed in an aqueous solution (0.05%) of Crystal Violet, a commercial dye, for one hour. It is transferred to a stirred rinse-bath for one hour and then allowed to drain for ten minutes. In the case of flat plastic panels, samples of appropriate size can be mounted in a standard colorimeter and the color intensity characterized on a numerical scale. Such values can then be related in a significant way to exposure to service conditions that the sample has been given.

Alternatively, such panel samples can be adapted in size and shape to examination in a spectrophotometer and characteristic peak absorbancies compared before and after real or simulated service exposures. While the dye salt may produce particularly strong absorbancies, especially in the ultraviolet, salt formation due to ion exchange in service can be confusing. Experience will show which absorbance frequency is most reliable as indicator in particular circumstances.

EXAMPLE 1

From a 0.5% aqueous solution of sodium hyaluronate, a 200-mil wet film was cast with a film applicator onto a clean Plexiglas panel. After standing overnight in air at 50% relative humidity and 68° F., the panel was immersed in methanol containing 2% of N-methylpyrrolidone. It was then dried at room temperature in an explosion-proof oven with forced draft ventilation for one hour, after which, half the film area was covered with heavy-duty aluminum foil.

The exposed film area was lightly but uniformly sprayed with a 0.1% solution in methyl ethyl ketone of Desmodur N, an aliphatic diisocyanate, catalyzed with dibutyl tin dilaurate. The resulting clear film was sticky and mobile to the touch. After standing overnight at room temperature, the clear film was non-tacky and firm to the touch.

The foil was removed from the control section of the film and the panel submerged in circulating 0.9% aqueous sodium chloride solution. The panel was removed periodically and observed as described above in "Test Procedures." Neither half of the film showed significant change for fourteen days. On the fifteenth day, the presence of the control film was in doubt, and it was no longer evident on the sixteenth day. The crosslinked film, on the other hand, was unchanged at this time and later.

The control film could be removed at any time during the first fourteen days by vigorous rubbing with the finger while submerged. The crosslinked film was not removed by this treatment.

This example illustrates covalent crosslinking of the mucopolysaccharide.

EXAMPLE 2

A 200-mil wet film was cast with a film applicator onto a clean Plexiglas panel from a 0.5% aqueous solution of sodium hyaluronate. After standing overnight in a forced-draft oven at room temperature, the panel was lightly and uniformly sprayed with a 0.1% solution of $BaCl_2$, $CaCl_2$ or $FeCl_3$. After standing for sixteen hours, the $BaCl_2$- and $CaCl_2$-treated films were slightly hazy and colorless (the $FeCl_3$-treated film was discolored) and were submerged in the normal saline bath. When examined the next day and thereafter, all films were clear and colorless. Again, control films of untreated hyaluronic acid persisted for ten to eighteen days. Films treated with the polyvalent salts were still present and unchanged in the hockey puck test after a month of submersion. Rubbing the film with a finger while submerged removed the control film at any time, but the treated films showed greater resistance to this treatment.

This example illustrates ionic crosslinking of the mucopolysaccharide films.

EXAMPLE 3

A film of 10 mils wet thickness of Tie-coat A[1] was cast on a Plexiglas panel and the panel baked at 200° F. for 30 minutes. After the panel had cooled, a second film of Tie-coat B[2] was cast in 10 mils wet thickness over the first coating and the panel again baked at 200° F. for 30 minutes. When cooled again to room temperature, a coating of sodium hyaluronate was applied from 0.5% aqueous solution at 200 mils thickness and allowed to dry at room temperature overnight. The next day, the panel was immersed in a 1:1 mixture of methanol and n-butyl acetate and again dried at room temperature in a stream of clean air. The polysaccharide film was then crosslinked with Desmodur N as described in Example 1.

The resulting panel was clear, colorless and caused no distortion of transmitted light. In the conventional knife test, the adhesion of the composite film among its component layers was judged to be excellent. The surface was readily and uniformly wetted by water, and the wet surface was uniformly lubricious in the hockey puck test. Long soaking in water caused no delamination or other visible change.

Notes

1. Tie-coat A is a copolymer comprising ethyl methacrylate and one mol-percent of methacrylic acid, supplied at 30% solids in xylol/n-butyl acetate (75/25).
2. Tie-coat B is a copolymer comprising methyl methacrylate, butyl acrylate, hydroxyethyl methacrylate and acrylic acid (mol ratios, 50:40:8:2, respectively) supplied in xylol/Cellosolve acetate (70/30).

EXAMPLE 4

A film of 30-mil wet thickness was cast on a Plexiglas panel from a 13.2% aqueous solution of chondroitin sulfate. After conditioning overnight at 50% R.H. and 68° F., the film had dried, shrunk and peeled away from the Plexiglas.

Another clean Plexiglas panel was sprayed with a 1% solution of catalyzed Desmodur N in MEK. After drying for one hour at room temperature, the surface was clear, colorless and tacky. Over this surface was cast a 30-mil wet film from 13.2% aqueous chondroitin sulfate. After conditioning overnight, the composite film was clear, firmly adhered to the substrate and unchanged in area from that on the previous day. The panel was submerged in normal saline solution and the crosslinked film was found to be very similar to crosslinked hyaluronate films in persistence and in the hockey puck test.

EXAMPLE 5

A Plexiglas panel was coated in separate steps with Tie-coat A and Tie-coat B, as described in detail in Example 3. A final coat of chondroitin sulfate was applied from 13.2% aqueous chondroitin sulfate solution, at a wet film thickness of 10 mils. After drying overnight at room temperature, the panel was sprayed with 1% BaCl₂ solution in water and again allowed to dry.

Submersion of the panel in normal saline solution with periodic removal for the hockey puck test showed long-term persistence of the film and retention of the hydrophilic characteristics.

EXAMPLE 6

A Plexiglas panel was coated with a 0.1% solution in MEK of catalyzed Desmodur N and allowed to dry in clean air at room temperature for 15 minutes. Over the same area was then cast a 100-mil wet film of 0.5% sodium hyaluronate in water. The panel was then immersed in a mixture of solvents comprising
49% Methanol
49% Acetone
2% N-Methylpyrrolidone.
The coated panel was then placed in a forced-draft oven overnight. On the following morning, it was clear, non-tacky and uniform in appearance. It was immersed in a circulating bath of 0.9% aqueous sodium chloride solution and was periodically thereafter removed briefly for the tests described above. These showed the continuing presence of the polysaccharide film for more than a month, at which time the experiment was discontinued.

EXAMPLE 7

A flat cast panel was made by copolymerizing in a glass mold 95 mole percent of methyl methacrylate (93.6 weight percent) and 5 mole percent of hydroxyethyl methacrylate (6.4 weight percent). One surface of the clear, hard, colorless copolymer was sprayed with a 1% solution of catalyzed Desmodur N in butyl acetate. After air-drying for one hour, a 100-mil wet film of sodium hyaluronate was applied over the diisocyanate. After standing overnight at room temperature, the clear composite panel was submerged in normal saline solution and tested daily thereafter. No change was observed after a month.

This example illustrates covalent crosslinking and grafting of the polysaccharide film to the polymer substrate.

EXAMPLE 8

A clear plastic panel comprising 95 mole percent MMA and 5 mole percent hydroxyethyl methacrylate was coated with catalyzed diisocyanate. Over the same area was then cast a 30% solution in ethylene dichloride and ethyl acetate of a copolymer comprising:
50 parts MMA
30 parts ethyl acrylate
20 parts hydroxyethyl methacrylate
The panel was dried in the forced-draft oven for 30 minutes at room temperature and then a second coating of diisocyanate was applied and the drying steps repeated. A 200-mil film of 0.5% sodium hyaluronate was then applied and the panel immersed in methanol-/acetone/N-methylpyrrolidone. After drying overnight in the forced-draft oven, the coated panel was clear, transparent and dry to the touch.

After six weeks immersion in normal saline solution, the wet panel was continuing to show no change in its slippery surface characteristic of the polysaccharide coating and its uniform appearance.

EXAMPLE 9

A flat cast panel was made by copolymerizing in a glass mold 95 mole percent of MMA (95.7 weight percent) and 5 mole percent of methacrylic acid (4.3 weight percent). The panel was soaked overnight in a 0.1% solution of BaCl₂ and rinsed the next day in distilled water. A 100-mil wet film of sodium hyaluronate was cast on one surface of the panel and conditioned overnight at ambient conditions. The clear coated panel was found to be resistant to removal in normal saline solution.

This example illustrates ionic grafting and crosslinking of the polysaccharide film to the plastic substrate.

EXAMPLE 10

An aqueous solution of sodium hyaluronate was converted to the free acid by treatment in a column with a macroreticular sulfonic ion-exchange resin in the hydrogen form. An equal volume of N-methylpyrrolidone was then added and the water removed by vacuum distillation. To this solution was added a mixture of catalyzed Desmodur N in dry butyl acetate, in amount calculated to supply one mole of diisocyanate for each fifty "moles" of glucoside nuclei in the polysaccharide.

The clear solution resulting was cast in film form onto Plexiglas and the panel then allowed to stand at room temperature for three days. At the end of this time, the coating was firm and dry to the touch. It was submerged in normal saline solution and when tested for more than a month showed the characteristic lubricious behavior of unmodified polysaccharide films. The film was not removed nor damaged by rubbing with the finger while submerged.

EXAMPLE 11

A Lexan polycarbonate panel was coated with a solution copolymer of methyl methacrylate, butyl acrylate, hydroxyethyl methacrylate, and acrylic acid, to which had been added 10% by weight, based on solids content of the polymer solution, of catalyzed Desmodur N. The film was dried at room temperature and then recoated with a 200-mil film of 0.5% hyaluronic acid. After a brief air-drying period, the panel was immersed in methanol/acetone/N-methylpyrrolidone, drained, and allowed to stand at room temperature. After 18 hours, the panel was hazy and dry to the touch. When immersed in water, the panel became clear and transparent with the slippery surface characteristic of the hyaluronate. After being rewetted, the panel was allowed to stand in air for a week, during which time it remained clear. When re-immersed, the film properties were maintained without further change on long immersion in water.

EXAMPLE 12

A flat cast panel was made by copolymerizing 77.5 g. (0.5 mol) of isocyanatoethyl methacrylate and 953 g. (9.5 mol) of carefully dried methyl methacrylate in a mold that had been dried for 2 hours at 115° C. and then continuously flushed with dry nitrogen while cooling to suitable temperature for filling with the monomer mix. The panel was coated with a 100-mil wet film of 0.5% aqueous hyaluronic acid. After drying overnight at room temperature, the film was uniformly sprayed with a 1% solution of dibutyltin dilaurate in n-butyl acetate. Grafting reactions between the polysaccharide and panel base occurred spontaneously overnight, with the result that the polysaccharide film was chemically and permanently bonded to the underlying polymer. The possibility of later hydrolysis of remaining isocyanato groups not involved in grafting at the interface, generating undesirable bubbles of carbon dioxide imbedded in the plastic, was originally of concern. However, experience showed no such disadvantage, perhaps because any such by-products were able to migrate through the polymer and escape without causing visible damage.

Applicants submit examples of polyisocyanates and catalysts usable in the foregoing, as follows:

POLYISOCYANATES

Desmodur N. Biuret tris(6-hexamethyleneisocyanate), 75% in xylene/Cellosolve acetate.

$$\begin{array}{c} HN(CH_2)_6NCO \\ | \\ O=C \\ | \\ N(CH_2)_6NCO \\ | \\ O=C \\ | \\ HN(CH_2)_6NCO \end{array}$$

Methylene bis(4,4'-isocyanatocyclohexane). Desmodur H.

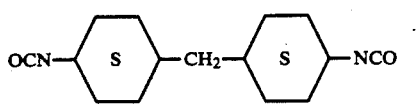

Isocyanatoethyl methacrylate and its polymers and copolymers.

$$\begin{array}{c} CH_2=C-COOCH_2CH_2NCO \\ | \\ CH_3 \end{array}$$

Isocyanatoethyl 6-isocyanatocaproate.

$$OCN(CH_2)_5COOCH_2CH_2NCO$$

Isocyanatoethyl 2-isocyanatopropionate.

$$OCNCH_2CH_2COOCH_2CH_2NCO$$

2,2,4-Trimethylhexamethylenediisocyanate.

$$\begin{array}{c} CH_3 \quad\quad CH_3 \\ | \quad\quad\quad | \\ OCNCH_2C-CH_2CH-CH_2CH_2NCO \\ | \\ CH_3 \end{array}$$

1,2-Diisocyanatomethylcyclobutane.

$$\begin{array}{c} CH_2-CH-CH_2NCO \\ | \quad\quad | \\ CH_2-CH-CH_2NCO \end{array}$$

CATALYSTS

Dibutyltin dilaurate. Catalyst T-12.

$$(C_4H_9)_2Sn(OOCC_{11}H_{23})_2$$

Dibutyltin di-2-ethylhexoate.

$$(C_4H_9)_2Sn(OOCC_7H_{15})_2$$

p-Toluenesulfonic acid.

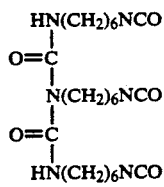

Stannous 2-ethylhexoate.

$$Sn(OOCC_7H_{15})_2$$

Zinc octoate.

$$ZnOOC(C_7H_{15})_2$$

Di-o-tolylzinc.

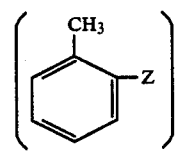

We claim:

1. A method of interlaminar grafting of continuous coatings upon an object, the coatings being different and not mutually soluble, the method comprising the steps of:

(a) coating the object with a solution of a polymer having a plurality of functional groups capable of chemically reacting with a mucopolysaccharide, and manifesting a high degree of adhesion to the object,
(b) removing solvent from said solution, so as to form a first continuous film,
(c) applying as a second coat an aqueous solution of a mucopolysaccharide,
(d) removing water from said second coat so as to form a second continuous film, and
(e) chemically joining said first and second films so as to effect an interlaminar graft, wherein both films retain their individual integrity.

2. The method of claim 1, wherein the mucopolysaccharide is hyaluronic acid or one of its salts.

3. The method of claim 1, wherein the mucopolysaccharide is chondroitin sulfate.

4. The method of claim 1, wherein the object to be coated is an optical lens.

5. The method of claim 1, wherein the object to be coated is a spectacle lens.

6. The method of claim 1, wherein the polymer forming the first film contains groups which are capable of forming covalent bonds with a mucopolysaccharide.

7. The method of claim 1, wherein the joining step comprises the step of heating the object.

* * * * *